(12) United States Patent
Koehring et al.

(10) Patent No.: US 11,616,693 B1
(45) Date of Patent: Mar. 28, 2023

(54) SYSTEMS AND METHODS FOR INDICATING CONNECTION RELEVANCE IN A NETWORK ENVIRONMENT

(71) Applicant: Fortinet, Inc., Sunnyvale, CA (US)

(72) Inventors: Paul Koehring, Chicago, IL (US); Jason Abate, Chicago, IL (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/734,839

(22) Filed: May 2, 2022

(51) Int. Cl.
*H04L 41/0853* (2022.01)
*H04L 41/22* (2022.01)
*H04L 41/5041* (2022.01)
*H04L 41/40* (2022.01)
*H04L 41/5054* (2022.01)

(52) U.S. Cl.
CPC .......... *H04L 41/0853* (2013.01); *H04L 41/22* (2013.01); *H04L 41/40* (2022.05); *H04L 41/5041* (2013.01); *H04L 41/5054* (2013.01)

(58) Field of Classification Search
CPC ..... H04L 41/0853; H04L 41/22; H04L 41/40; H04L 41/5041; H04L 41/5054
USPC ................................ 709/220, 224, 226, 228
See application file for complete search history.

(56) References Cited

U.S. PATENT DOCUMENTS

| | | | | |
|---|---|---|---|---|
| 7,092,867 B2* | 8/2006 | Huang | ............... | H04L 41/22 701/1 |
| 8,521,857 B2* | 8/2013 | Maxwell | ............ | G11B 27/105 715/802 |
| 8,799,829 B2* | 8/2014 | Grosz | ................ | G06F 3/04845 709/219 |
| 10,120,928 B2* | 11/2018 | Kushmerick | .......... | H04L 41/40 |
| 10,284,660 B1* | 5/2019 | Nene | ...................... | H04L 67/02 |
| 10,616,038 B2* | 4/2020 | Kushmerick | .......... | H04L 67/75 |
| 2014/0082506 A1* | 3/2014 | Maxwell | ........... | H04N 21/8166 715/738 |
| 2014/0195921 A1* | 7/2014 | Grosz | .................. | G06F 3/1205 715/738 |
| 2018/0285234 A1* | 10/2018 | Degaonkar | ......... | G06F 11/0709 |
| 2020/0204460 A1* | 6/2020 | Schneider | .............. | H04L 43/10 |

FOREIGN PATENT DOCUMENTS

AU    2005273611 A1 *   3/2007   ............. G06F 16/40

* cited by examiner

*Primary Examiner* — Khanh Q Dinh
(74) *Attorney, Agent, or Firm* — HDC Intellectual Property Law, LLP (57) ABSTRACT

Systems, devices, and methods are discussed for memory efficient network use modeling.

20 Claims, 6 Drawing Sheets

SYSTEMS AND METHODS FOR INDICATING CONNECTION RELEVANCE IN A NETWORK ENVIRONMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to identifying use of various connections in a networking environment, and more particularly to systems and methods for memory efficient network use modeling.

BACKGROUND

It is helpful to understand which network devices are used by a network element. To do this, network maps may be created showing all devices to which the network element is connected. The problem with this is that it represents a snapshot in time and network connectivity changes rapidly leaving any given map meaningless after a short period. One approach is to store a large number of such maps so that network use can be shown over time. The problem with this approach is that it requires the storage of a large amount of information.

Thus, there exists a need in the art for more advanced approaches, devices and systems for mapping network use over time in a memory efficient manner.

SUMMARY

Various embodiments provide systems and methods for memory efficient network use modeling.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Various embodiments provide systems and methods for memory efficient network use modeling.

Various embodiments provide a time-varying map of network elements and/or connections. For example, a network element may be taken out of service in which case the network element would not appear in a time-specific network map, but it would be maintained in the time-varying map. Over time it will be removed from the time-varying map depending upon whether it has been brought back into service and/or how long is has not been visible in a time-specific map. Similarly, the connections between the network elements will vary with time. Some will show up very consistently in time-specific maps, while others will be more sporadic, and others will show up for a period of time and then disappear entirely. Various embodiments provide for modelling the network changes using a time-varying map using only minimal memory resources.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", "network device", or "network element" generally refers to a device or appliance in virtual or physical form that is operable to perform one or more network or endpoint functions. In some cases, a network appliance may be a database, a network server, computer, mobile phone, or the like. Some network elements may be implemented as general-purpose computers or servers with appropriate software operable to perform the one or more network functions. Other network elements may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance", "network security device", or a "network security element" that may reside within the particular network that it is protecting or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

Networks include a variety of connections made between network elements. The term "connections" is used in its broadest sense to mean any mechanism by which two or more network elements may be communicably coupled. As such, a connection may be, but is not limited to wired and/or wireless communication paths, and may support various communication protocols known in the art. Based upon the disclosure provided herein, one of ordinary skill in the art will recognize a variety of connections and/or protocols that may be used in relation to different embodiments. As used herein, the term "connectivity" may be used to collectively describe a combination of multiple connections and/or network elements.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods that include: receiving, by a processing resource, a first time-specific network image corresponding to a first time stamp; receiving, by the processing resource, a second time-specific network image corresponding to a second time stamp; receiving, by the processing resource, a third time-specific network image corresponding to a third time stamp; after the time of the third time stamp, generating, by the processing resource, a first relevance value for the first connectivity element based at least in part on the first connectivity element being included in the third time-specific network image; after the time of the third time stamp, generating, by the processing resource, a second relevance value for the second connectivity element based at least in part on the second connectivity element being included in the second time-specific network image, but not the third time-specific network element; after the time of the third time stamp, generating, by the processing resource, a third relevance value for the third connectivity element based at least in part on the third connectivity element being included in the third time-specific network element; and assembling, by the processing resource, a time-varying network image including: an indication of the first connectivity element along with the third time stamp and the first relevance value, an indication of the second connectivity element along with the second time stamp and the second relevance value; and an indication of the third connectivity element along with the third time stamp and the third relevance value. The first time-specific network image includes at least a first connectivity element; the second time-specific network image includes at least the first connectivity element and a second connectivity element; and the third time-specific network image includes at least the first connectivity element and a third connectivity element, but not the second connectivity element. A time of the second time stamp is after a time of the first time, and a time of the third time stamp is after the time of the second time stamp.

In some instances of the aforementioned embodiments, the receiving the first time-specific network image includes generating, by the processing resource, the first time-specific network image; the receiving the second time-specific network image includes generating, by the processing resource, the second time-specific network image; and the receiving the third time-specific network image includes generating, by the processing resource, the third time-specific network image. In some such instances, generating the first time-specific network image includes: scanning a network from a perspective of a first network element to yield a first scan, scanning the network from a perspective of a second network element to yield a second scan, and assembling at least the first scan and the second scan to yield the first time-specific network image.

In various instances of the aforementioned embodiments, the receiving the first time-specific network image includes receiving, by the processing resource, receiving a first scan of the network from the perspective of a first network node, receiving a second scan of the network from the perspective of a second network node, and assembling at least the first scan and the second scan to yield the first time-specific network image. In some instances of the aforementioned embodiments, the methods further include: formatting, by the processing resource, the time-varying network image for a display to yield a formatted time-varying network image; and displaying the formatted time-varying network image via the display.

In various instances of the aforementioned embodiments, the first relevance value is greater than the second relevance value, and the first relevance value is greater than the third relevance value. In some instances of the aforementioned embodiments, the second relevance value is greater than the third relevance value. In various instances of the aforementioned embodiments, the second relevance value is less than the third relevance value.

In some instances of the aforementioned embodiments, the first relevance value is calculated in accordance with the following equation:

$$\text{Weight}(t, t_{last}, w_{last}, \alpha) + \alpha$$

where $\alpha$ is a decay factor, t is a value of the third time stamp, $t_{last}$ is the value of the third time stamp, and $w_{last}$ is a value of Weight(t, $t_{last}$, $w_{last}$, $\alpha$) calculated between a time of the second time stamp and a time of the third time stamp, and where Weight(t, $t_{last}$, $w_{last}$, $\alpha$) is calculated in accordance with the following equation:

$$\text{Weight}(t, t_{last}, w_{last}; \alpha) = (1-\alpha)^{(t - t_{last}) * w_{last}}$$

In some such instances, a is user programmable.

Other embodiments provide systems for representing a network that include: a processing resource and a non-transitory computer-readable medium. The non-transitory computer-readable medium is coupled to the processing resource, and has stored therein instructions that when executed by the processing resource cause the processing resource to: receive a first time-specific network image corresponding to a first time stamp, where the first time-specific network image includes at least a first connectivity element; receive a second time-specific network image corresponding to a second time stamp, where a time of the second time is after a time of the first time stamp, and where the second time-specific network image includes at least the first connectivity element and a second connectivity element; receive a third time-specific network image corresponding to a third time stamp, where a time of the third time stamp is after the time of the second time stamp, and where the second time-specific network image includes at least the first connectivity element and a third connectivity element, but not the second connectivity element; after the time of the third time stamp, generate a first relevance value for the first connectivity element based at least in part on the first connectivity element being included in the third time-specific network image; after the time of the third time stamp, generate a second relevance value for the second connectivity element based at least in part on the second connectivity element being included in the second time-specific network image, but not the third time-specific network element; after the time of the third time stamp, generate a third relevance value for the third connectivity element based at least in part on the third connectivity element being included in the third time-specific network element; and assemble a time-varying network image including: an indication of the first connectivity element along with the third time stamp and the first relevance value, an indication of the second connectivity element along with the second time stamp and the second relevance value; and an indication of the third connectivity element along with the third time stamp and the third relevance value.

Yet other embodiments provide non-transitory computer-readable storage media embodying a set of instructions, which when executed by a processing resource, causes the processing resource to: receive a first time-specific network image corresponding to a first time stamp, where the first time-specific network image includes at least a first connectivity element; receive a second time-specific network image corresponding to a second time stamp, where a time of the second time is after a time of the first time stamp, and where the second time-specific network image includes at least the first connectivity element and a second connectivity element; receive a third time-specific network image corresponding to a third time stamp, where a time of the third time stamp is after the time of the second time stamp, and where the second time-specific network image includes at least the first connectivity element and a third connectivity element, but not the second connectivity element; after the time of the third time stamp, generate a first relevance value for the first connectivity element based at least in part on the first connectivity element being included in the third time-specific network image; after the time of the third time stamp, generate a second relevance value for the second connectivity element based at least in part on the second connectivity element being included in the second time-specific network image, but not the third time-specific network element; after the time of the third time stamp, generate a third relevance value for the third connectivity element based at least in part on the third connectivity element being included in the third time-specific network element; and assemble a time-varying network image including: an indication of the first connectivity element along with the third time stamp and the first relevance value, an indication of the second connectivity element along with the second time stamp and the second relevance value; and an indication of the third connectivity element along with the third time stamp and the third relevance value.

Figure 1A:
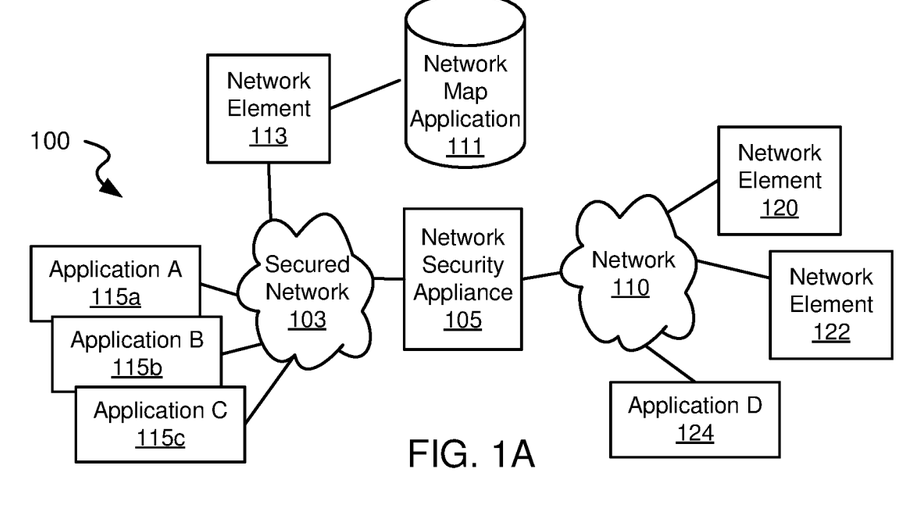
FIGS. 1A-1C illustrate a network architecture having a network element executing a network map application capable of generating a network map conveying time-varying information in accordance with various embodiments.

Turning to FIG. 1A, a network architecture 100 having a network element 113 executing a network map application 111 is shown in accordance with various embodiments. Execution of network map application 111 generates a network map conveying time-varying information. As shown, network architecture 100 additionally includes a secured network 103 that is secured by a network security appliance 105. Secured network 103 may be any type of network known in the art. Thus, secured network 103 may be, but is not limited to, a wireless network, a wired network or a combination thereof that can be implemented as one of the various types of networks, such as the Internet, an Intranet, a Local Area Network (LAN), a Wide Area Network (WAN), and the like. Secured network 103 provides for internetwork communications between network element 113 and applications 115 (i.e., application A 115a, application B 115b, and application C 115c). Network security appliance 105 operates as a gateway between secured network 103 and outside networks (e.g., a network 110). Network 110 may be any type of network known in the art. Thus, network 110 may be, but is not limited to, a wireless network, a wired network or a combination thereof that can be implemented as one of the various types of networks, such as the Internet, an Intranet, a Local Area Network (LAN), a Wide Area Network (WAN), and the like. Network security appliance 105 provides for communications between network element 113 and network element 120, network element 122, and network element 124 via network 110.

Figure 1B:
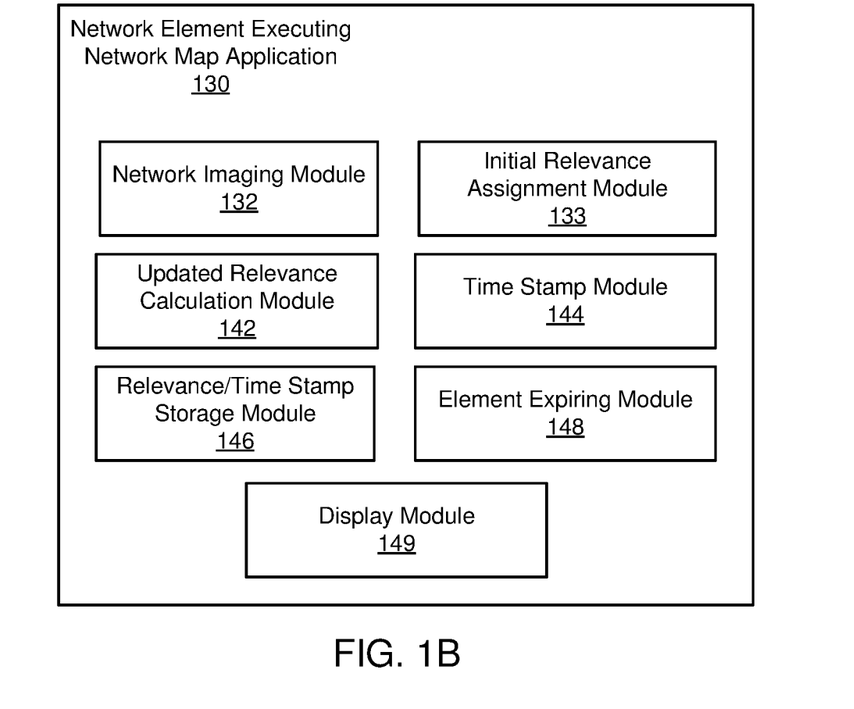

Turning to FIG. 1B, an example implementation of network element 113 executing network map application 111 (i.e., network element executing network map application 130) is shown in accordance with some embodiments. As shown, network element executing network map application 130 includes: a network imaging module 132, an initial relevance assignment module 133, an updated relevance calculation module 142, a time stamp module 144, a relevance/time stamp storage module 146, and an element expiring module 148, and a display module 149.

A network imaging module 132 is configured to san a network to identify one or more connectivity elements including, but not limited to, network elements and connections, and to create a time-specific network image including the identified connectivity elements. In some embodiments, network imaging module 132 may perform the processes discussed below in relation to block 202 and block 210 of FIG. 2. The initial network image and time-specific network images may be created from the perspective of a single network node, or may be created from the perspective of multiple network nodes with network images corresponding to respective network nodes being assembled together to create a common initial network image or time-specific network image.

Initial relevance assignment module 133 is configured to assign an initial relevance value to a network connectivity element that is being added to a time-varying network image. In some embodiments, time stamp module 144 may perform the time stamping processes discussed below in relation to block 204 and block 220 of FIG. 2.

Updated relevance calculation module 142 is configured to calculate an updated relevance value for each previously seen connectivity element in a time-varying network image. In some embodiments, time stamp module 144 may perform the time stamping processes discussed below in relation to block 216 and block 232 of FIG. 2.

Time stamp module 144 is configured to generate a time stamp that can be associated with a time-specific network image and/or each connectivity element seen in a given time-specific network image. The time stamp indicates a time relative to other time-specific network images. In some embodiments, time stamp module 144 may perform the time stamping processes discussed below in relation to block 206, block 218, and block 222 of FIG. 2.

Relevance/time stamp storage module 146 is configured to store a combination of relevance values and time stamps to a storage device as part of a time-varying network image. In some embodiments, time stamp module 144 may perform the storing processes discussed below in relation to block 206, block 218, and block 222 of FIG. 2.

Element expiring module 148 is configured to compare a relevance value for each connectivity element with a threshold value to determine whether the connectivity element has sufficient relevance to warrant keeping the connectivity element in the time-varying network image. Where a relevance value is too low, the connectivity element corresponding to the relevance value is removed from the time-varying network image. In some embodiments, time stamp module 144 may perform the storing processes discussed below in relation to block 228 and block 230 of FIG. 2.

Display module 149 is configured to receive a request to display a time varying network image, format the time varying image for a particular display, and display the formatted time-varying image to the display. In some embodiments, display module 149 may be configured to perform the processes discussed below in relation to FIG. 4.

Figure 1C:
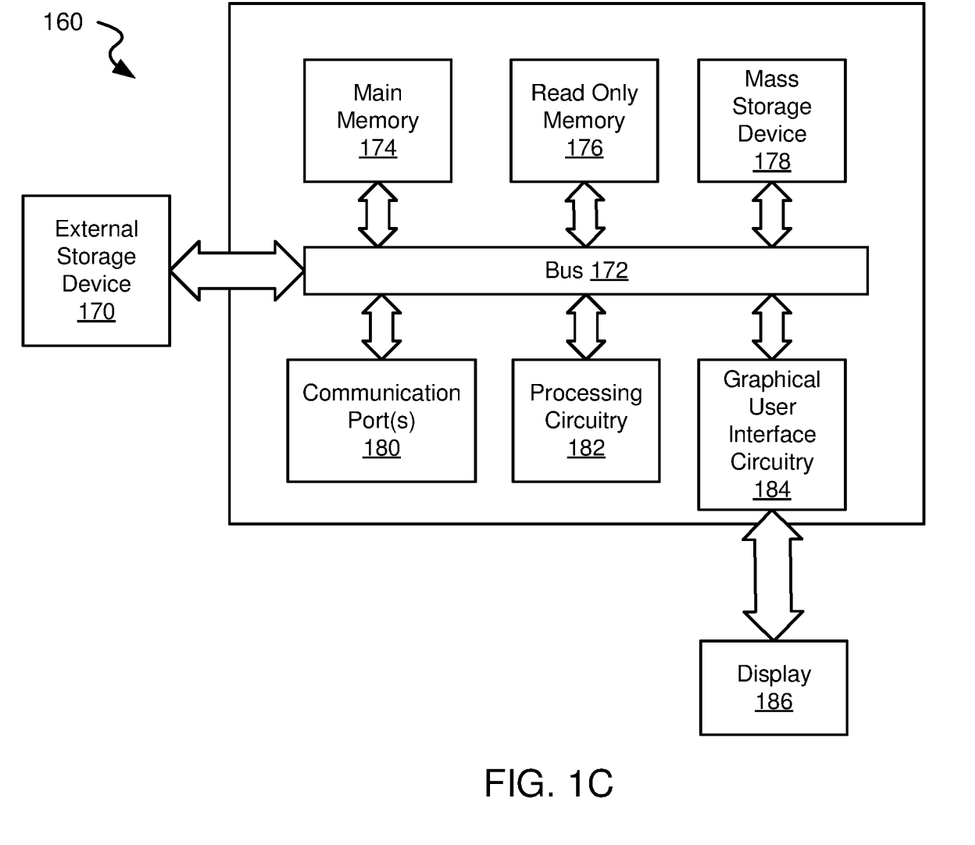

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 1010, and one or more processing resources (e.g., processing circuitry 182), and graphical user interface circuitry 184. Graphical user interface circuitry 184 formats information for display on a display 186. In one embodiment, computer system 160 may represent some portion of security orchestration system 120, network security appliance 115, one or more computers on which applications A 110, application B 111, and/or application C 112 are executing, and/or one or more network servers governing database A 106, database B 107, and/or database C 108.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer system limit the scope of the present disclosure.

Figure 2:
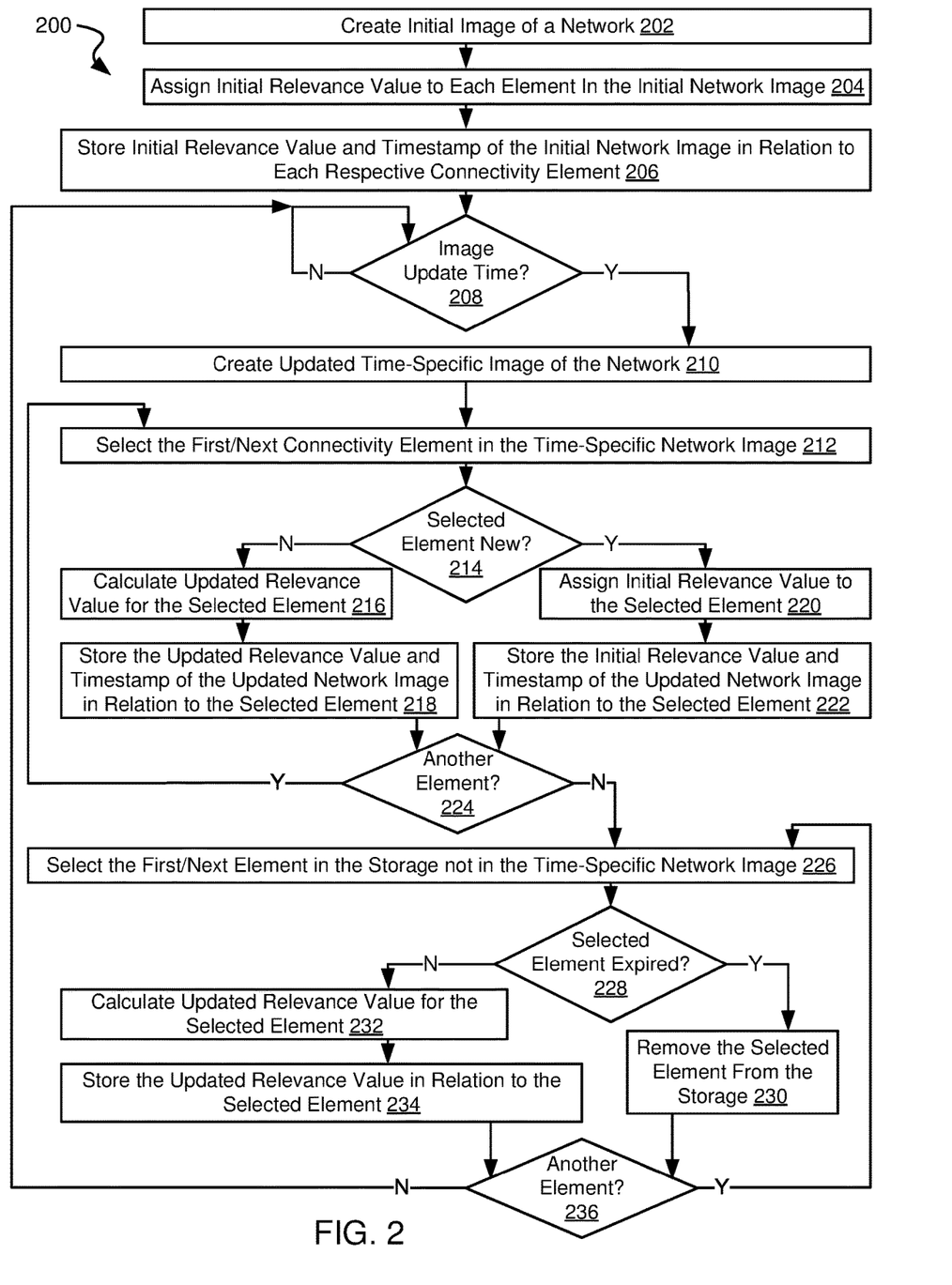
FIG. 2 is a flow diagram showing a method in accordance with some embodiments for generating a network map including time-varying information.

Turning to FIG. 2, a flow diagram 200 shows a method in accordance with various embodiments for generating a network map including time-varying information. Following flow diagram 200, an initial image of a network is created (block 202). Creating the initial network image may include, but is not limited to, using a standard network scanning utility such as, for example, Netstat™ or Traceroute™ to identify one or more connectivity elements including, but not limited to, network elements and connections, and to create a time-specific network image including the identified connectivity elements. In some embodiments, creating either the initial network image or a later time-specific network image may be done from a number of network elements (i.e., from each of network element 113, network element 120, network element 122, and/or network security appliance 105), and each of the network images gathered into one common time-specific network image. Thus, while examples discussed herein show network images from the perspective of network element 113, embodiments of the present invention assemble and process network images from multiple network nodes to yield a common time-specific network image. It will be appreciated that such an approach gives a much broader view of connectivity elements in the network, and a resulting time-varying network image is a more comprehensive view of connectivity elements and respective relevance values. Creating the initial network image results in an indication of each network element actively operating and one or more connections to the respective network elements specific to the time that the image was created. Any approach known in the art for discovering network connectivity may be used in relation to different embodiments. The initial network image is a time-specific network image that is specific to the initial time, To.

Figure 3A:
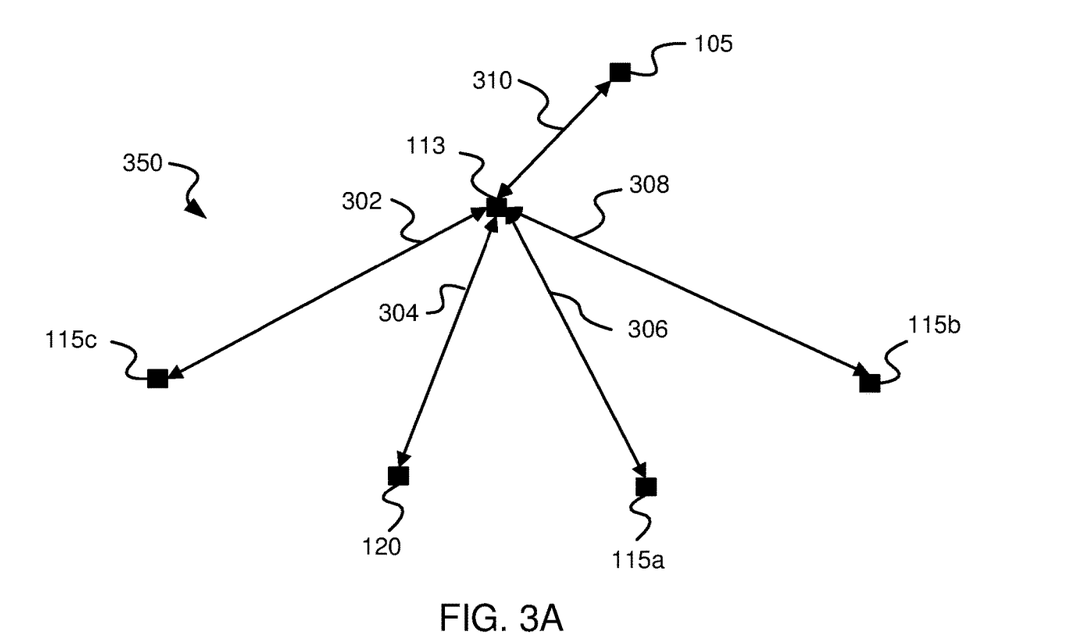
FIGS. 3A-3D graphically depict states of a network map updated using the processes of FIG. 2 to include time-varying information in accordance with some embodiments.

Turning to FIG. 3A, an example initial network image 350 is shown where it was determined that network application A 115a was identified and using a connection 306, network application B 115b was identified and using a connection 308, network application C 115c was identified and using a connection 302, network security appliance 105 was identified using a connection 310, and network element 120 was identified and using a connection 304. The network elements are shown as boxes and the connections are shown as arrows.

Returning to flow diagram 200 of FIG. 2, an initial relevance is assigned to each network element and a time stamp is created for each network element and connection in the initial network image (block 204). This initial relevance value may be any value that is assigned to an element the first time it is seen in a network image. In some embodiments, this initial relevance value may be user programmable. A relevance value is adjusted higher each time the corresponding network element or connection is seen in a subsequent network image, and the relevance value is reduced each time the corresponding network element or connection is not seen in a subsequent network image. The process of increasing the relevance value and decreasing the relevance value is described in more detail below.

A time stamp is created indicating when the initial network image was created, and the initial relevance value and time stamp of the initial network image are stored in relation to each respective network element and connection (block 206). The combination of information is combined for form a time-varying network image. This time-varying network image can be formatted for display to graphically represent the network to a user.

Figure 3B:
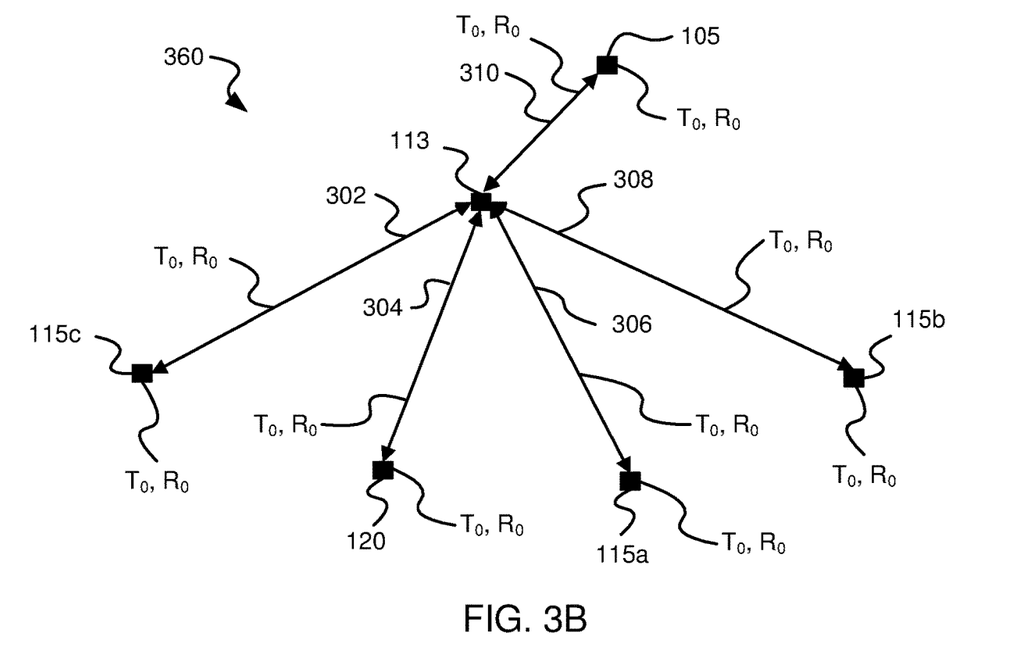

Turning to FIG. 3B, an example time-varying network image 360 of the network is shown that corresponds to initial network image 350. As shown, each of connections 302, 304, 306, 308, 310 and each of application A 115a, application B, 115b, application C 115c, network element 120, and network security appliance 105 have an associated time stamp (i.e., $T_0$) and relevance value ($R_0$). In some embodiments, the initial relevance value ($R_0$) is one '1'. In other embodiments, the initial relevance value ($R_0$) is 0.5. Based upon the disclosure provided herein, one of ordinary skill in the art will recognize a variety of initial values that can be used for the initial relevance value in accordance with different embodiments. At this juncture where it is the initial network image 350 that is being augmented with the time stamp and relevance value, the time stamp and relevance value are the same for all. However, as discussed below, this will change as elements are found or not found in subsequent time-specific network images.

Returning to flow diagram 200 of FIG. 2, it is determined whether it is time to update the network image (block 208). In some embodiments, the network image is updated periodically based upon a timer. In other embodiments, the network image is updated whenever network image or a defined amount of network image data has been provided asynchronously by other devices. Based upon the disclosure provided herein, one of ordinary skill in the art will recognize a variety of basis for identifying a time for updating the network image that may be used in relation to different embodiments.

Where it is time to update the network image (block 208), an updated time-specific network image is created (block 210). This may be done, for example, using the approach discussed above in relation to block 202. Based upon the disclosure provided herein, one of ordinary skill in the art will understand a variety of approaches that may be used in relation to different embodiments for creating an updated network image.

Figure 3C:
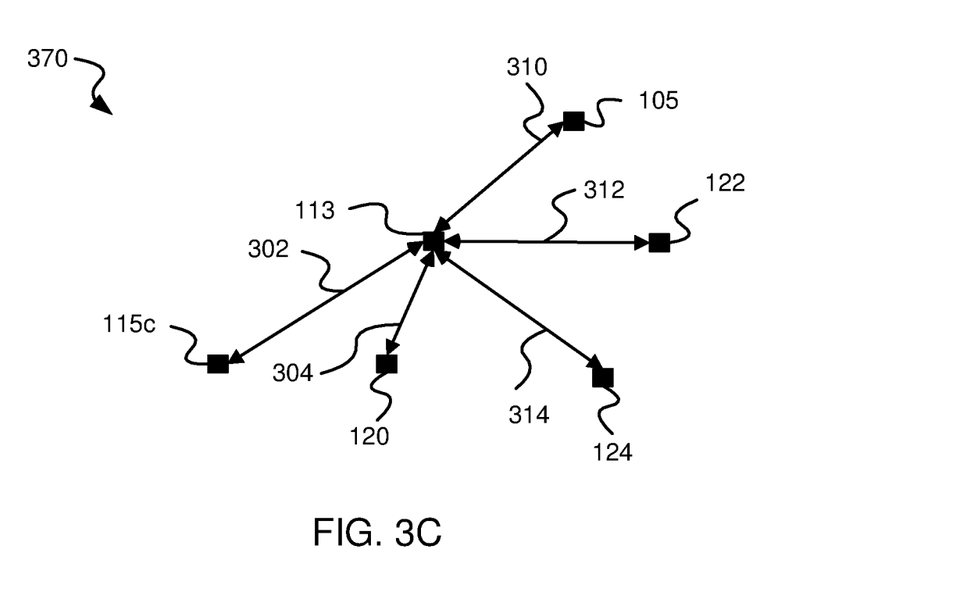

Turning to FIG. 3C, an example of an updated time-specific network image 370 is shown where it was determined that network application C 115c, connection 302, network element 120, network connection 304, network security appliance 105, and connection 310 remain from the prior time-specific network image (i.e., initial network image 350); network element 122, connection 314, network element 124, and connection 312 are new since the prior time-specific network image; and network application B 115b, connection 308, network application A 115a, connection 306 have disappeared from the prior time-specific network image.

Returning to flow diagram 200 of FIG. 2, the first connectivity element in the updated time-specific network image is selected (block 212). Any of the connectivity elements (either connection or network element) can be selected as the first selected. It is then determined whether the selected connectivity element is new (i.e., not seen in the prior time-varying network image)(block 214). As an example, if the selected connectivity element is connection 312 from FIG. 3C, it would be considered new as it was not included in time-varying network image 360. As another example, if the selected connectivity element is network application C 115c from FIG. 3C, it would not be considered new as it was included in time-varying network image 360.

Where the selected connectivity element is new (block 214), the initial relevance value (e.g., the value $R_0$ from FIG. 3B) is assigned to the selected connectivity element (block 220). As with block 204, the initial relevance value may be any value that is assigned to an element the first time it is seen in a network image. In some embodiments, this initial relevance value may be user programmable. The initial relevance value and a time stamp indicating the time of the updated network image are stored in relation to each respective new network element and new connection (block 222).

Alternatively, where the selected connectivity element is not new (block 214), an updated relevance value is calculated for the selected connectivity element (block 216). In some embodiments, the updated relevance value is calculated using an algorithm based upon an exponential moving average where the updated relevance value is between zero (0) and one (1). The value of the relevance value increases toward one (1) as a connectivity element continues to appear in updated network images, and the value of the relevance value decreases toward zero (0) as it continues to remain absent from subsequent updated network images. The updated relevance value and a time stamp indicating the time of the updated network image are stored in relation to each respective continuing network element and continuing connection (block 218). Again, this combination of information is combined for form an updated time-varying network image that can be formatted for display to graphically represent the network to a user. The information may be written over the previous values for the same connectivity element. As such, only one set of information is maintained for each connectivity element allowing for both an indication of the existence of a given connectivity element and corresponding time-varying relevance value without requiring large amounts of storage space.

In some embodiments, the following algorithm is used to calculate updated relevance values as a weight function (Weight(t, $t_{last}$, $w_{last}$, $\alpha$)).

$$\text{Weight}(t, t_{last}, w_{last}; \alpha) = (1-\alpha)^{(t-t_{last})*w_{last}}$$

where:
t=the current time in seconds;
$t_{last}$=the last time the weight factor was calculated for the connectivity element;
$w_{last}$=the value of the weight factor as of $t_{last}$; and
$\alpha$=a decay factor.

In some embodiments, the decay factor is a user programmable value.

The same weight function can then be used to calculate an updated relevance value in accordance with the following equation:

$$\text{Updated Relevance Value} = \text{Weight}(t, t_{last}, w_{last}, \alpha) + \alpha$$

As will be appreciated, the decay factor ($\alpha$) controls the rate at which values increase and decrease over time. In some embodiments, the decay factor is chosen in such a way that a relevance value will decrease to half of its previous value when the selected connectivity element goes a defined period of time without being seen in an updated network image. As an example, where the defined period of time is one (1) hour, the decay factor ($\alpha$) will be $1.925 \times 10^{-4}$. Based upon the disclosure provided herein, one of ordinary skill in the art will recognize a variety of values for the decay factor ($\alpha$) that may be selected in accordance with different embodiments.

It is determined whether another connectivity element remains to be selected from the updated time-specific network image (block 224). Where another connectivity element remains to be selected (block 224), the next connectivity element in the updated time-specific network image is selected (block 212) and the processes of blocks 214-224 are repeated for the next selected connectivity element.

Alternatively, where no connectivity element remains to be selected (block 224), the first element in the storage (i.e., the time-varying network image) that was not included in the time-specific network image (i.e., any connectivity element in the time-varying network image that was not selected and processed in blocks 212-224) is selected for processing (block 226). It is determined whether the selected connectivity element has expired (block 228). In some embodiments, this determination is made by comparing the relevance value associated with the selected connectivity element with a threshold value. In some cases, the threshold value is user programmable. Where the connectivity element has not been seen for a time that its relevance value has been decreased below the threshold value it is considered expired.

Where the connectivity element is determined to be expired (block 228), it is removed along with all of its corresponding relevance and time stamp information from the storage (i.e., the time-varying network image) (block 230). By doing this, the storage space required to maintain the time-varying network image is reduced.

Alternatively, where the connectivity element is determined not to have expired (block 228), an updated relevance value is calculated for the selected connectivity element (block 232). This may be done using the same approach discussed above in relation to block 216, however, in this case where the connectivity element has not been seen, the result will be a reduction of the relevance value compared to the prior relevance value for the selected connectivity element. The updated relevance value is stored in relation to each respective missing network element and missing connection (block 234). The time stamp is not updated, but rather remains with the time stamp from when the selected connectivity element was last seen in an updated time-specific network image.

It is determined whether any more connectivity elements missing from the updated time-specific network image but included in the time-varying network image remain to be processed (block 236). Where another connectivity element remains to be processes (block 236), the next connectivity element missing from the updated time-specific network image but included in the time-varying network image is selected (block 226) and the processes of blocks 228-236 are repeated for the next selected connectivity element. Otherwise, the process returns to block 208 to await the next updated time-specific network image.

Figure 3D:
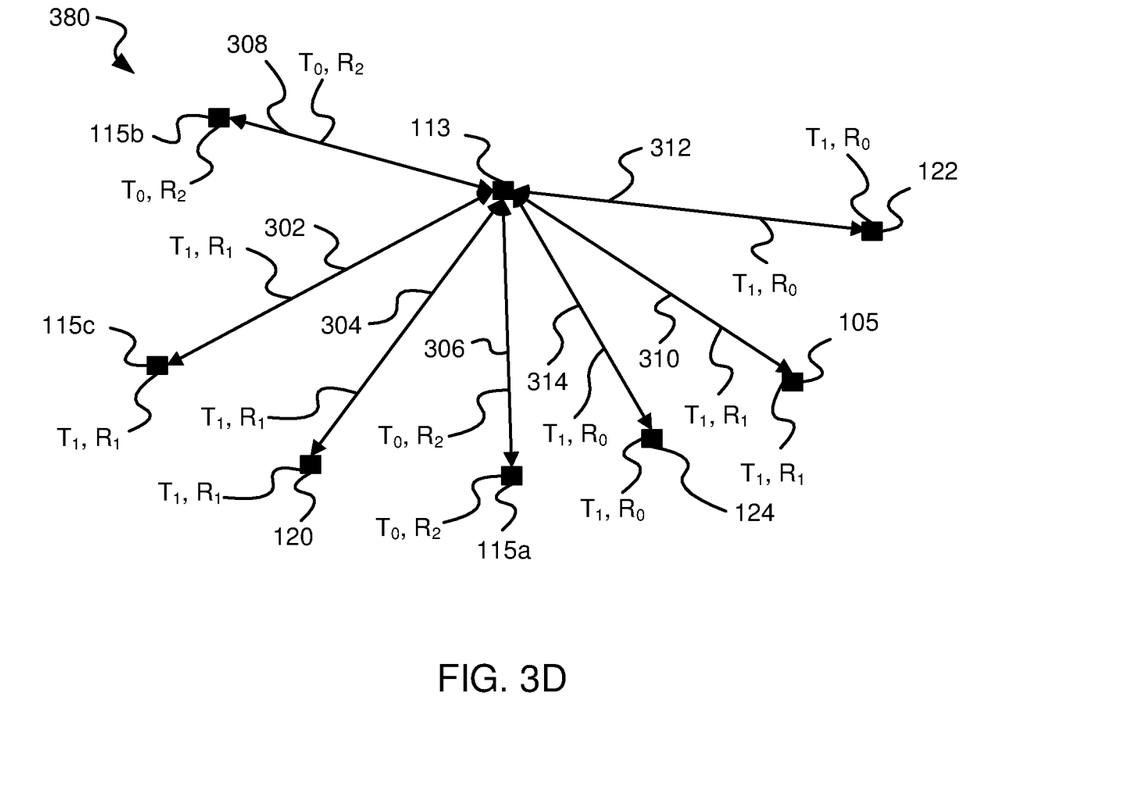

At this juncture, the time-varying network image is complete with all identified, but non-expired connectivity elements included. Turning to FIG. 3D, an example time-varying network image 380 of the network is shown that corresponds to a combination of initial network image 350 and time-specific network image 370 where no connectivity elements have expired. In time-varying network image 380, $T_0$ indicates that the connectivity element was last seen when the initial network image was created, and $T_1$ indicates that the connectivity element was last seen in the updated time-specific network image. In this case where only two time-specific network images (i.e., initial network image 350 and time-specific network image 370) have been processed, only two time stamps (i.e., $T_0$ and $T_1$) are possible. However, as more time-specific network images are processed, a large variety of time stamps will be included in the resulting time-varying network image. $R_0$, $R_1$, and $R_0$ are the relevance values specific to the respective connectivity element to which it is associated. $R_0$ is the initial relevance value assigned when a connectivity element is first included in the time-varying network image. $R_1$ is the relevance value calculated for those connectivity elements that remained (i.e., seen in both initial network image 350 and time-specific network image 370), and is thus greater than $R_0$. $R_2$ is the relevance value calculated for those connectivity elements that were found in initial network image 350, but were missing from time-specific network image 370, and is thus less than $R_0$. As more and more time-specific network images are incorporated into the time-varying network image, many more relevance values will be calculated and included depending upon how consistent and/or how long it has been since a connectivity element was found in a time-specific network image.

Figure 4:
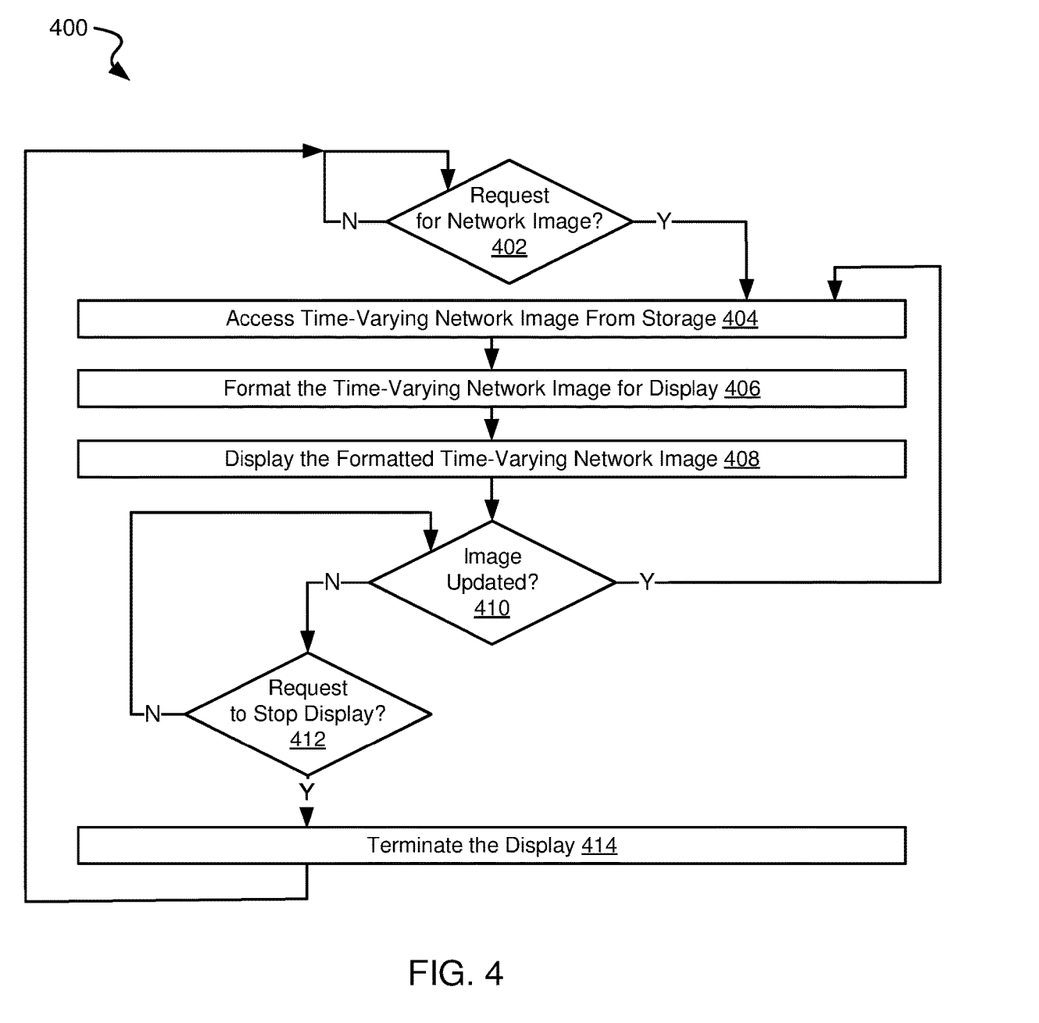
FIG. 4 is a flow diagram showing a method for displaying a time-varying network image in accordance with some embodiments.

Turning to FIG. 4, a flow diagram 400 shows a method for displaying a time-varying network image in accordance with some embodiments. Following flow diagram 400, it is determined if a request has been received to display a network image (block 402). Such a request may be received using any mechanism known in the art. Where a request is received (block 402), a time-varying network image is accessed from a storage device (block 404) and formatted for display (block 406). The formatted time-varying network image is then displayed (block 408). Such formatting and displaying can be done using any processes known in the art for performing the function.

It is determined if the time stamp and relevance information for connectivity elements has been modified in the storage to yield an updated time-varying network image (block 410). Where the information has been updated (block 410), the processes of blocks 404-410 are repeated. Otherwise (block 410), it is determined whether a request to stop displaying has been received (block 412). Where a request to terminate the display has been received (block 412), the display is terminated (block 414) and the process returns to block 402. Otherwise (block 412), the process returns to block 410.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method, the method comprising:
    receiving, by a processing resource, a first time-specific network image corresponding to a first time stamp, wherein the first time-specific network image includes at least a first connectivity element;
    receiving, by the processing resource, a second time-specific network image corresponding to a second time stamp, wherein a time of the second time is after a time of the first time, and wherein the second time-specific network image includes at least the first connectivity element and a second connectivity element;

receiving, by the processing resource, a third time-specific network image corresponding to a third time stamp, wherein a time of the third time stamp is after the time of the second time stamp, and wherein the third time-specific network image includes at least the first connectivity element and a third connectivity element, but not the second connectivity element;

after the time of the third time stamp:
generating, by the processing resource, a first relevance value for the first connectivity element based at least in part on the first connectivity element being included in the third time-specific network image;
generating, by the processing resource, a second relevance value for the second connectivity element based at least in part on the second connectivity element being included in the second time-specific network image, but not the third time-specific network element;
generating, by the processing resource, a third relevance value for the third connectivity element based at least in part on the third connectivity element being included in the third time-specific network element; and
assembling, by the processing resource, a time-varying network image including: an indication of the first connectivity element along with the third time stamp and the first relevance value, an indication of the second connectivity element along with the second time stamp and the second relevance value; and an indication of the third connectivity element along with the third time stamp and the third relevance value.

2. The method of claim 1, wherein the receiving the first time-specific network image includes generating, by the processing resource, the first time-specific network image; wherein the receiving the second time-specific network image includes generating, by the processing resource, the second time-specific network image; and wherein the receiving the third time-specific network image includes generating, by the processing resource, the third time-specific network image.

3. The method of claim 2, wherein generating the first time-specific network image includes: scanning a network from a perspective of a first network element to yield a first scan, scanning the network from a perspective of a second network element to yield a second scan, and assembling at least the first scan and the second scan to yield the first time-specific network image.

4. The method of claim 1, wherein the receiving the first time-specific network image includes receiving, by the processing resource, receiving a first scan of the network from the perspective of a first network node, receiving a second scan of the network from the perspective of a second network node, and assembling at least the first scan and the second scan to yield the first time-specific network image.

5. The method of claim 1, the method further comprising:
formatting, by the processing resource, the time-varying network image for a display to yield a formatted time-varying network image; and
displaying the formatted time-varying network image via the display.

6. The method of claim 1, wherein the first relevance value is greater than the second relevance value, and the first relevance value is greater than the third relevance value.

7. The method of claim 1, wherein the second relevance value is greater than the third relevance value.

8. The method of claim 1, wherein the second relevance value is less than the third relevance value.

9. The method of claim 1, wherein the first relevance value is calculated in accordance with the following equation:

$$\text{Weight}(t, t_{last}, w_{last}, \alpha) + \alpha$$

wherein $\alpha$ is a decay factor, t is a value of the third time stamp, $t_{last}$ is the value of the third time stamp, and $w_{last}$ is a value of Weight(t, $t_{last}$, $w_{last}$, $\alpha$) calculated between a time of the second time stamp and a time of the third time stamp, and wherein Weight(t, $t_{last}$, $w_{last}$, $\alpha$) is calculated in accordance with the following equation:

$$\text{Weight}(t, t_{last}, w_{last}; \alpha) = (1-\alpha)^{(t-t_{last})*w_{last}}.$$

10. The method of claim 9, wherein $\alpha$ is user programmable.

11. A system for representing a network, the system comprising:
a processing resource;
a non-transitory computer-readable medium, coupled to the processing resource, having stored therein instructions that when executed by the processing resource cause the processing resource to:
receive a first time-specific network image corresponding to a first time stamp, wherein the first time-specific network image includes at least a first connectivity element;
receive a second time-specific network image corresponding to a second time stamp, wherein a time of the second time is after a time of the first time stamp, and wherein the second time-specific network image includes at least the first connectivity element and a second connectivity element;
receive a third time-specific network image corresponding to a third time stamp, wherein a time of the third time stamp is after the time of the second time stamp, and wherein the second time-specific network image includes at least the first connectivity element and a third connectivity element, but not the second connectivity element;
after the time of the third time stamp:
generate a first relevance value for the first connectivity element based at least in part on the first connectivity element being included in the third time-specific network image;
generate a second relevance value for the second connectivity element based at least in part on the second connectivity element being included in the second time-specific network image, but not the third time-specific network element;
generate a third relevance value for the third connectivity element based at least in part on the third connectivity element being included in the third time-specific network element; and
assemble a time-varying network image including: an indication of the first connectivity element along with the third time stamp and the first relevance value, an indication of the second connectivity element along with the second time stamp and the second relevance value; and an indication of the third connectivity element along with the third time stamp and the third relevance value.

12. The system of claim 11, wherein the instructions that when executed by the processing resource cause the processing resource to receive the first time-specific network image include instructions that when executed by the processing resource cause the processing resource to: generate the first time-specific network image; wherein the instructions that when executed by the processing resource cause the processing resource to receive the second time-specific network image include instructions that when executed by the processing resource cause the processing resource to: generate the second time-specific network image; and wherein the instructions that when executed by the processing resource cause the processing resource to receive the third time-specific network image include instructions that when executed by the processing resource cause the processing resource to: generate the third time-specific network image.

13. The system of claim 12, wherein the instructions that when executed by the processing resource cause the processing resource to generate the first time-specific network image includes instructions that when executed by the processing resource cause the processing resource to: scan the network from a perspective of a first network element to yield a first scan, scan the network from a perspective of a second network element to yield a second scan, and assemble at least the first scan and the second scan to yield the first time-specific network image.

14. The system of claim 11, wherein the instructions that when executed by the processing resource cause the processing resource to receive the first time-specific network image include instructions that when executed by the processing resource cause the processing resource to: receive a first scan of the network from the perspective of a first network node, receive a second scan of the network from the perspective of a second network node, and assemble at least the first scan and the second scan to yield the first time-specific network image.

15. The system of claim 11, wherein the system further includes a display, and wherein the instructions that when executed by the processing resource further cause the processing resource to:
format the time-varying network image for the display to yield a formatted time-varying network image; and
display the formatted time-varying network image via the display.

16. The system of claim 11, wherein the first relevance value is greater than the second relevance value, and the first relevance value is greater than the third relevance value.

17. The system of claim 11, wherein the second relevance value is greater than the third relevance value.

18. The system of claim 11, wherein the second relevance value is less than the third relevance value.

19. The system of claim 11, wherein the first relevance value is calculated in accordance with the following equation:

$$\text{Weight}(t, t_{last}, w_{last}, \alpha) + \alpha$$

wherein $\alpha$ is a decay factor, t is a value of the third time stamp, $t_{last}$ is the value of the third time stamp, and $w_{last}$ is a value of Weight(t, $t_{last}$, $w_{last}$, $\alpha$) calculated between a time of the second time stamp and a time of the third time stamp, and wherein Weight(t, $t_{last}$, $w_{last}$, $\alpha$) is calculated in accordance with the following equation:

$$\text{Weight}(t, t_{last}, w_{last}; \alpha) = (1-\alpha)^{(t-t_{last}) * w_{last}}.$$

20. A non-transitory computer-readable storage medium embodying a set of instructions, which when executed by a processing resource, causes the processing resource to:
receive a first time-specific network image corresponding to a first time stamp, wherein the first time-specific network image includes at least a first connectivity element;
receive a second time-specific network image corresponding to a second time stamp, wherein a time of the second time is after a time of the first time stamp, and wherein the second time-specific network image includes at least the first connectivity element and a second connectivity element;
receive a third time-specific network image corresponding to a third time stamp, wherein a time of the third time stamp is after the time of the second time stamp, and wherein the second time-specific network image includes at least the first connectivity element and a third connectivity element, but not the second connectivity element;
after the time of the third time stamp:
generate a first relevance value for the first connectivity element based at least in part on the first connectivity element being included in the third time-specific network image;
generate a second relevance value for the second connectivity element based at least in part on the second connectivity element being included in the second time-specific network image, but not the third time-specific network element;
generate a third relevance value for the third connectivity element based at least in part on the third connectivity element being included in the third time-specific network element; and
assemble a time-varying network image including: an indication of the first connectivity element along with the third time stamp and the first relevance value, an indication of the second connectivity element along with the second time stamp and the second relevance value; and an indication of the third connectivity element along with the third time stamp and the third relevance value.

* * * * *